(12) United States Patent
Turner et al.

(10) Patent No.: US 8,460,434 B2
(45) Date of Patent: Jun. 11, 2013

(54) METHANE RECOVERY FROM A LANDFILL GAS

(75) Inventors: Andrew Derek Turner, Abingdon (GB); George Cutts, Kenilworth (GB); Richard John Lilleystone, London (GB)

(73) Assignee: Gasrec Limited, London (GB)

( * ) Notice: Subject to any disclaimer, the term of this patent is extended or adjusted under 35 U.S.C. 154(b) by 675 days.

(21) Appl. No.: 12/160,812

(22) PCT Filed: Jan. 9, 2007

(86) PCT No.: PCT/EP2007/050198
§ 371 (c)(1),
(2), (4) Date: Jul. 29, 2010

(87) PCT Pub. No.: WO2007/080169
PCT Pub. Date: Jul. 19, 2007

(65) Prior Publication Data
US 2010/0292524 A1    Nov. 18, 2010

(30) Foreign Application Priority Data
Jan. 13, 2006   (EP) .................................. 06250157

(51) Int. Cl.
*B01D 53/00*    (2006.01)
(52) U.S. Cl.
USPC ............... 95/117; 95/122; 95/136; 95/148; 95/127; 585/802; 585/818; 585/820
(58) Field of Classification Search
None
See application file for complete search history.

(56) References Cited

U.S. PATENT DOCUMENTS

| | | | |
|---|---|---|---|
| 5,291,943 A | 3/1994 | Dhir | |
| 5,451,249 A * | 9/1995 | Spiegel et al. | 95/117 |
| 5,642,630 A | 7/1997 | Abdelmalek | |
| 6,301,927 B1 * | 10/2001 | Reddy | 62/619 |

(Continued)

FOREIGN PATENT DOCUMENTS

| | | |
|---|---|---|
| DE | 3617223 | 5/1986 |
| DE | 29709266 | 10/1997 |

(Continued)

OTHER PUBLICATIONS

A Hybrid of Vapor Permeation and Membrane-Based Absorption-Stripping for Voc Removal and Recovery From Gaseous Emmissions; Poddar et al. 1997.

(Continued)

*Primary Examiner* — Tam M Nguyen

(57) ABSTRACT

A process is provided for recovering methane from landfill feed gas and other anaerobic digestors. The process comprising the following steps: firstly treating the feed gas to remove $H_2S$; subsequently compressing the gas; and then treating the gas to remove further impurities. Additionally, there is provided a chiller for reducing the temperature of a gas flow. The chiller comprising: a shell arranged to be chilled, a plurality of bores through the shell and through which the gas flows, in use, and forming, together with the shell, a heat exchanger, a tangential inlet to each bore for creating a spiral flow of the gas through the bore, in use. Furthermore, a process is provided for purifying a gas feed using a reversible gas absorber unit comprising two hollow fiber gas/liquid contactors, each of which is arranged to provide a counter-current flow. The process comprising: setting up a partial pressure gradient in the first contactor using a reversible absorber capable of forming an adduct with the gas to be removed, introducing feed gas to the first contactor, forming an adduct of the gas to be absorbed, feeding the adduct to the second contactor, supplying a flushing counter-current flow to the second contactor to liberate the gas, and re-circulating the reversible absorber to the first contactor.

20 Claims, 15 Drawing Sheets

U.S. PATENT DOCUMENTS

| | | | |
|---|---|---|---|
| 6,565,626 B1 | 5/2003 | Baker et al. | |
| 2006/0248921 A1* | 11/2006 | Hosford et al. | 62/611 |
| 2007/0095205 A1 | 5/2007 | Palumbo | |

FOREIGN PATENT DOCUMENTS

| | | |
|---|---|---|
| EP | 51122690 | 10/1976 |
| WO | 98/04339 | 2/1998 |
| WO | 99/35455 | 7/1999 |
| WO | 03/092849 | 11/2003 |

OTHER PUBLICATIONS

Treatment of Land Fill Gas by Gas Permeation—Pilot Plant Results and Comparison to Alternatives; Rautenbach et al. 1993.

Hollow Fiber Membrane Contactor Based $CO_2$ Absorbtion-Stripping Using Novel Solvents and Membranes; Kosarju et al. American Chemical SocietyNov. 12, 2004.

Search Report From PCT/EP 2007/050198.

* cited by examiner

METHANE RECOVERY FROM A LANDFILL GAS

The present invention relates to methane recovery from either landfill feed gas (LFG) or other anaerobic digesters, for example digesters used for processing farming waste or food processing waste.

The bacteriological digestion of organic material in landfill sites results in the generation of substantial quantities of methane gas over prolonged periods of time. Not only does methane have a stronger "greenhouse" effect than carbon dioxide if released into the atmosphere, but also has the potential as a useful chemical feedstock or fuel, for example for transportation. The recovery and purification of methane from this source for such applications is therefore of great environmental benefit.

There are a number of known systems for recovering and purifying methane from landfill feed gas. There are several different types of impurities that must be removed before the feed gas is of a sufficient purity to be a commercially viable commodity. These impurities can be divided into different types: Condensable liquids such as water and Volatile Organic Compounds (VOCs); molecular gases that are oxidisable ($H_2S$) or reducible ($O_2$), acidic ($H_2S$, $CO_2$) or inert ($N_2$); and particulate matter. In related technologies, a number of methods of removing some or all of these impurities are known. Different systems emphasise different techniques as appropriate for the recovery and purification of different components of feed gas. It is common to begin by compressing the feed gas so that the machinery involved in the following steps can be smaller and more compact.

Gastec Technology BV discloses, in a data sheet published at http://www.gastechnology.nl/download/selox.pdf, a process known in the industry as the Selox process. This process is set out schematically in FIG. 1. The Selox process 10 comprises absorption and regeneration phases. The absorption phase begins with the introduction to the system of sulphur-containing gas 11, which may be combined with an air or oxygen-containing feed 12. This is then passed into a water saturator 13. The saturated and aerated sulphur-containing gas 11 is then introduced into a catalytic absorption column 14, which removes $H_2S$. In this process, the oxygen introduced into the feed stream irreversibly reacts at the solid catalyst in the columns with $H_2S$ to yield sulphur and water by the following reaction:

$$2H_2S + O_2 \rightarrow 2S + 2H_2O$$

The resulting gas is then introduced to filter 15 and the clean gas 16 is then removed from the system. In the regeneration part of the Selox process 10, a previously saturated absorption column 17 is subjected to a recirculated high temperature non-oxidising gas stream to transfer sulphur through the vapour phase to a condenser 15 and to return the column 14 to its original state so that it may be subsequently used as an absorption column 14. The condensate 19 of liquid sulphur is then removed from the system. When the column becomes loaded with sulphur and the porosity becomes blocked this can be removed in situ by a thermal process which vaporises the sulphur which is subsequently condensed from a recirculated gas stream.

In the regeneration part of the process the gas may be heated using the gas heater H and the transit of the gas around the system may be increased by the recycle blower B.

Gas Technology Products LLC disclose a system known in the art as Lo-Cat®. An example of this system is shown schematically in FIG. 2 which is published at http://www.gtp-merichem.com/downloads/pomano.pdf. FIG. 2 shows a Lo-Cat® process for removing 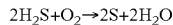$H_2S$ as part of a system for controlling the emissions from landfill gas which is used for power production. As can be seen from FIG. 2 the process begins with the delivery of the "sour gas" from a first stage blower or low pressure compressor into an interceptor 21 to remove droplets and particulates followed by a Lo-Cat® tower spray unit 22 in which $H_2S$ is oxidised to S. The Lo-Cat® solution then is regenerated in unit 23 by bubbling air through it from an air blower 24 to re-oxidise the ferrous complex to ferric complex and simultaneously filtering the sulphur in a belt filter 25. The output gas of the unit 23 is fed firstly to a carbon absorber 26 that subsequently feeds to the turbine exhaust stack 27. Regenerated Lo-Cat® reagent is pumped back from unit 23 to the spray tower 22. The treated gas from spray toner 22 is subjected to a coalescing filter 28 before being removed from the system and being sent to second stage compression 29.

Specifically in the area of landfill feed gas processing in the USA, certain standard processes have been established. These are set out at http://www.meadowlands.state.nj.us. The standard ordering to steps for LFG processing in the USA is described as follows:
1. Landfill feed gas (LFG) is compressed.
2. Liquids removed from gas by chilling.
3. Hydrogen sulfide is removed from gas
4. Liquids condensed from processing—predominantly water—are cleaned prior to off-site disposal.
5. Gas is odorized and sent via pipeline to PSE&G.

In "U.S. Climate change Technology Program—Technology option for the Near and Long Term", November 2003, Page 155, it is disclosed that, in general, the removal of corrosive trace impurities is accomplished through the use of:
1. phase separators,
2. coalescing filters, and
3. impregnated/non-impregnated activated carbon adsorbents.
4. a zeolite adsorbent removes remaining polar molecules (specifically water) to a concentration of a few parts per million. Oxygen also must be removed at this point, if present in more than trace quantities.
5. a cryogenic purifier where the carbon dioxide is separated out, leaving a high-grade Liquified Natural Gas (LNG) product consisting of 90%-97% methane. The remainder of the LNG is dissolved nitrogen.

Rautenbach R and Welsch K, "Treatment of landfill gas by gas permeation—pilot plant results and comparison to alternatives" Desalination 90(1-3) (1993) 193-207 discloses a pilot plant illustrated schematically in FIG. 3. This shows a process 30 for recovering and purifying landfill feed gas (LFG). The process 30 begins with the compression of the gas in a compressor 31. This reduces the volume occupied by a given weight of gas and therefore reduces the required size of the remaining vessels. In addition, heat exchange occurs much more readily in a compressed gas and also absorption on a surface and permeation across membranes is more efficient once the gas is compressed.

In the above-mentioned process, the compressed gas is then treated with Granulated Activated Carbon (GAC) in order to remove $H_2S$. The gas is subsequently cooled in a chiller 32 and then the Volatile Organic Compounds are removed in a unit 33 using Temperature Swing Adsorption (TSA). Following the removal of VOCs in the unit 33, the TSA unit 33 is periodically regenerated with hot steam, and the vapour subsequently condensed in condenser 34, before routing to an effluent plant 38. The feed gas is compressed in compressor 35 to a pressure of 35 Bar (3.5 MPa). The gas is then fed through a series of membranes 36 which are designed to remove carbon dioxide that is still present as a contaminant in the feed gas. This gas, once removed from the gas stream, is flared 37. The purified methane can then be stored, transported or used on site, as appropriate.

Whilst there are some advantages, as set out above, for compressing the gas before treating it to remove $H_2S$, this standard process for treating landfill feed gas, as described above with reference to FIG. 3, has some problems associated with it. In particular, $H_2S$ is a very corrosive gas and therefore the compressor which treats the gas before the removal of the $H_2S$ must be made from expensive materials that are capable of processing such a corrosive gas.

In order to overcome the problems identified above with the standards that have been established in the art, there is provided a process for recovering methane from landfill feed gas and other anaerobic digesters, the process comprising the following steps:
 firstly treating the feed gas to remove $H_2S$;
 subsequently compressing the gas; and
 then treating the gas to remove further impurities.

The present invention treats the feed gas to remove $H_2S$ before compressing the gas. This ordering of steps would be very counter-intuitive to the man skilled in the art who would be accustomed to seeing the compression step first because of the space and cost saved by carrying out all subsequent processing steps at smaller volume and with better heat transfer rates. However, as $H_2S$ is a highly corrosive gas, it is advantageous to remove it from the feed gas first. With the $H_2S$ removed, the feed gas is much less corrosive and the wear on the subsequent processing units is considerably reduced.

The removal of impurities may be achieved by: chilling the compressed gas to between 0.1° C. to 10° C., preferably between 1° C. to 3° C., to remove water and VOCs and filtering to remove particulate matter. Additionally, the removal of impurities may also be achieved by the further processing steps of passing the feed gas through a PSA for drying followed by a GAC column for removing residual VOCs, followed by cold finger analysis and a further GAC column.

The cold finger analysis method comprises the exposure of the gas stream to a chilled surface, typically held at −40° C. The chilled surface will collect any residual condensable impurities over a period of time. On periodic collection of this material, which can be achieved by warming and sampling of a diverted gas stream, an integrated analysis of great sensitivity of impurity content can be achieved to assess when the first GAC column is saturated and thus requires an exchange. The new column is replaced as the trail column, whilst the previous trail is used as the lead.

The resulting treated feed gas is preferably then filtered and exposed to membrane units in order to remove carbon dioxide and oxygen, followed by a final step of a molecular pore engineered adsorber PSA to remove nitrogen and polishing the carbon dioxide removal. In order to protect the compressor from corrosion, and to enable the use of cheaper materials of fabrication, the removal of $H_2S$ is the first stage in the process.

The PSA drier needs to be protected from clogging with particulates so is preferably placed after a filter. Also in order to minimise the size of the PSA, dehumidifying is preferably carried out before this by a simple chiller. Not only does this remove much of the water vapour, but also condenses out the bulk of the VOCs. With the coalescence of the droplets, significant particulates are also removed in this step. Placing the chiller before the fines filter reduces the load on this stage, thus reducing replacement or cleaning.

A GAC column is preferably placed after the PSA drier to polish any final traces of VOCs.

The efficiency and capacity of this absorber is greatly enhanced by operating on a dry particle-free gas stream. The membrane step which removes the bulk of the $CO_2$ content of the stream (and also adventitiously 50% of the $O_2$) is preferably placed after the GAC stage, as the membrane needs to be protected from VOCs and any particulates in order to have a long life. The final Molecular Gate PSA step follows the membrane to remove the bulk of any nitrogen and most of the remainder of the oxygen, as well as polishing the final traces of $CO_2$. Operating on a dry particle-free gas extends the operational life of the absorber material. By careful control of gas recovery, contamination with air can be minimised, thus reducing the amount of oxygen that needs to be removed to meet the specification required by the methane product liquefier (<1% oxygen). As the membrane used to separate $CO_2$ is also effective at removing substantial amounts of oxygen, in these circumstances a separate oxygen removal stage may not be required.

Additionally, the removal of impurities may be achieved by the further processing steps of: passing the feed gas through a first membrane unit to remove carbon dioxide; passing the treated gas through a second membrane unit to remove oxygen, and subsequently a PSA drier to dry and remove VOCs and finally a molecular pore engineered absorber PSA drier to remove nitrogen and polish carbon dioxide removal.

As the $CO_2$ and $O_2$ transfers are not necessarily dry processes, these are advantageously positioned before the final PSA drier. As $CO_2$ comprises approximately 50% of the gas composition, this unit is placed first to enable downstream equipment to be smaller.

The PSA drier is also able to function as a VOC polisher, while the final Molecular Gate PSA, which uses molecular engineered absorbers, polishes final $CO_2$ removal and the bulk $N_2$ removal. A slip-stream of dry product gas can be used in the regeneration of the PSA drier, carrying the water back to the initial desulphurisation stage, so that the methane content can be recovered.

In another example the removal of impurities can be achieved by: passing the feed gas through a first membrane unit for removing carbon dioxide, passing the feed gas through a second membrane unit for removing oxygen, passing the feed gas through a cascade of at least two stages of membrane units for removing nitrogen and a final PSA for drying, removing VOCs and carbon dioxide polishing.

In order to protect the compressor from corrosion, and to enable the use of cheaper materials of fabrication, the Sulfa Treat is the first stage in the process which is designed to remove $H_2S$ and large particulates. The subsequent $CO_2$ and $O_2$ membrane systems need to be protected from clogging with particulates so are placed after a filter. To improve the effectiveness of the filter and reduce the frequency of cleaning or replacement, the stream needs to be dehumidified before this by a simple chiller. Not only does this remove much of the water vapour, but also condenses out the bulk of the VOCs. With the coalescence of the droplets, significant particulates are also removed in this step.

The $CO_2$ and $O_2$ membranes remove some water vapour, thus reducing the burden on the final PSA drier. As $CO_2$ comprises approximately 50% of the gas composition, this unit is placed first to enable downstream equipment to be smaller. As nitrogen permeable membranes are not as selective as $CO_2$ or $O_2$ membranes based on selective absorption and diffusive transfer, nitrogen is removed using a cascade of membrane units.

If the PSA drier is configured to use a basic adsorber, the drier is able to function not only as a drier but also as a VOC and $CO_2$ polisher. A slip stream of dry product gas can be used in the regeneration of the PSA drier, carrying the water back to the initial desulphurisation stage, so that the methane content can be recovered.

In a further example the removal of impurities may be achieved by centrifugal separation for removing oxygen, carbon dioxide, nitrogen and VOCs followed by a PSA for removing VOCs, water vapour and any remaining carbon dioxide.

The primary separation process is preferably by virtue of molecular mass in a centrifuge device. However, in order to protect both the compressor and centrifuge from corrosion, and to enable the use of cheaper materials of fabrication, the Sulfa Treat is the first stage in the process which is designed to remove $H_2S$ and large particulates. The fine tolerances of the centrifuge may need to be protected from erosion by particulates so can be placed after a filter. To improve the effectiveness of the filter and reduce the frequency of cleaning or replacement, the stream can be dehumidified before this by a simple chiller. Not only does this remove much of the water vapour, but also condenses out the bulk of the VOCs. With the coalescence of the droplets, significant particulates are also removed in this step.

As the compressors will raise the gas temperature (to above its dew point), it may not be necessary to include some significant pre-treatment, being limited only to the $H_2S$ removal stage, which advantageously also removes water droplets and large particulates.

The final PSA drier needs to be used only on the purified methane product stream. If the PSA drier is configured to use a basic adsorber, this is able to function not only as a drier but also as a VOC and $CO_2$ polisher. A slip-stream of dry product gas can be used in the regeneration of the PSA drier, carrying the water back to the initial desulphurisation stage, so that the methane content can be recovered.

In a further example the removal of impurities may be achieved by a PSA drier for removing water vapour and VOCs, activated carbon columns for removing residual VOCs, at least one membrane for removing bulk carbon dioxide and an Engelhard Molecular Gate® multi-stage PSA for nitrogen removal with water and carbon dioxide residual polishing.

The $H_2S$ removal may be conducted by: reaction with a hydrated iron oxide in solid form; reaction with an oxidising redox couple in solid form; scrubbing with a solution of a ferric complex with subsequent regeneration in a separate column with air; polishing the stream at a downstream membrane, selective absorber process; or Pressure Swing Adsorption (PSA) drier with a basic adsorber.

The feed gas may be compressed to between 3 Bar (0.3 MPa) and 15 Bar (1.5 MPa), preferably to approximately 9 Bar (0.9 MPa). This is advantageous because it results in a reduced flow rate, resulting in a smaller plant size. It also provides improved absorption and adsorption process kinetics and capacity and improved heat transfer, thus minimising heat exchanger sizes.

$H_2O$ may be removed from the feed gas by: chilling the gas to between 0.1° C. and 10° C., preferably 1° C. to 3° C., to condense the water; selective water vapour permeation across a membrane; or using a PSA unit.

The chiller may be a rifled tube and shell heat exchanger, or which may have a top plate that induces tangential flow into each of the smooth bored tubes of a more conventional tube and shell heat exchanger to induce a helical flow to aid the coalescence of larger particles. Alternatively, separate vortex inducing tangential flow devices may be incorporated into each of the heat exchanger tubes.

VOCs may be removed from the feed gas by: chilling the gas to between 0.1° C. and 10° C., preferably 1° C. to 3° C., under pressure of between 3 Bar (0.3 MPa) and 15 Bar (1.5 MPa) to condense the water and entrain some VOCs; a PSA drier; a GAC non-regenerated absorber; or a centrifugal separator.

Particulate material may be removed from the feed gas by: the depth filter effect of a porous solid $H_2S$ removal system, a scrubber or from a low humidity stream at a filter.

$CO_2$ may be removed from the feed gas by: a selective permeable membrane; a reversible absorber unit; a PSA with selective adsorption; or a centrifugal separator.

$N_2$ may be removed from the feed gas by: an $N_2$ selectively permeable membrane; a PSA with selective adsorption; or a centrifugal separator.

$O_2$ may be removed from the feed gas by: a reversible absorber unit; a wet reduction and subsequent stream drying; a PSA with selective adsorption; a centrifugal separator; or dry reduction.

One means of chemical reduction of residual oxygen is based on the catalytic use of methane over a precious metal catalyst (eg Pd).

$$2O_2 + CH_4 \rightarrow CO_2 + 2H_2O$$

However, as the catalyst is easily poisoned by $H_2S$, this stage would need to be located after the PSA stage, which effectively polishes any residual $H_2S$. However, as the reduction process generates both $CO_2$ and $H_2O$, these contaminants will need to be removed prior to liquefaction of the methane product (eg by the technology described above or at least a second PSA stage.

Preferably, the reversible absorber unit operates by recirculation between two hollow-fibre gas/liquid contactors under a partial pressure gradient between the feed gas stream and the exhaust, which may be a partial vacuum.

As an example of dry reduction of $O_2$, a finely divided metal (supported e.g. on a zeolite) may be contacted with the gas stream such that the corresponding metal oxide is formed, preferably at ambient temperature.

$$O_2 + 2Cu \rightarrow 2CuO$$

This can subsequently be regenerated in a separate step by reduction with for example the methane content of the feed gas possibly at an elevated temperature:—

$$4CuO + CH_4 \rightarrow 4Cu + CO_2 + 2H_2O$$

The waste gas stream can be routed to the initial Sulfa Treat to recover any unused methane and condense the water produced.

Preferably, each of the processes leaves the feed gas at 9 Bar (0.9 MPa) so that repeat compressions are avoided by choosing processes that remove impurities at low pressure, maintaining the feed gas at high pressure.

Furthermore, according to the present invention, there is provided a chiller for reducing the temperature of gas flow, the chiller comprising: a shell arranged to be chilled, a plurality of bores through the shell and through which the gas flows, in use, and forming, together with the shell, a heat exchanger, a tangential inlet to each bore for creating a spiral flow of the gas through the bore, in use.

Preferably the bore is a rifled bore. The heat exchanger may be vertically orientated and the tangential inlet to the individual bores may be located at the top of the heat exchanger. The tangential inlet may take the form of separate caps for insertion into the top of the heat exchanger or separate cap for each tube in the heat exchanger or, alternatively, a single plate may provide the spiral flow of the gas in all of the bores within the heat exchanger. Preferably the shell is chilled, in use, by a refrigerant. Preferably the chiller further comprises a sensor for maintaining the refrigerant at the same pressure as the gas flow.

Furthermore, according to the present invention, there is provided a process for purifying, a gas feed using a reversible gas absorber unit comprising two hollow fibre gas/liquid contactors, each of which is arranged to provide a counter-current flow, the process comprising:
setting up a partial pressure gradient in the first contact using a reversible absorber capable of forming a adduct with the gas to be removed,
introducing a feed line into the first contactor,
forming an adduct of the gas to be absorbed,
feeding the adduct to the second contactor,
supplying a flushing counter-current flow to the second contactor to liberate the gas, and
re-circulating the reversible absorber to the first contactor.

The gas to be absorbed may be oxygen and the reversible absorber may be a cobalt, iron or manganese complex. Alternatively, the gas to be absorbed may be carbon dioxide and the reversible absorber may be a weak base. Preferably, each contactor comprises a bundle of fibres operating in parallel.

The present invention will now be described in detail with reference to the accompanying drawings in which.

The table below shows, in the central column, the physical characteristics of typical feed gas after treatment to remove $H_2S$ and also the levels of the various impurities that are found. The characteristics and impurities are listed in the left column. The right column shows the levels of the same characteristics and impurities when the feed gas has been fully treated using the process according to the present invention as presented in FIG. 4.

| Parameter | Feed | Product |
|---|---|---|
| Maximum feed rate | 2 074 Nm³/h | 1 038 Nm³/h |
| Pressure | 800 kPa(g) | 700 kPa(g) |
| Temperature | ~20° C. (15-25° C.) | ~15° C. |
| Particulate matter | <0.5 microns | — |

-continued

| Parameter | Feed | Product |
|---|---|---|
| $CH_4$ | 35-55% | 97.6% |
| $CO_2$ | 42-55% | 0.006% |
| $N_2$ | 8-25% | 2.2% |
| $O_2$ | 0.5-2.5% | 0.2% |
| $H_2S$ | <6 ppm | — |
| $H_2O$ | Saturated (~1%) | — |
| Oil | <0.01 ppm | — |
| VOC/Siloxane | Trace | — |

FIGS. 4 to 7 show four different versions of the process according to the present invention. In all four of the processes, the first step is to remove $H_2S$ by a Sulfa treat process 101. This process 101 is a solid porous $H_2S$ removal system based on neutralisation by hydrous ferric oxide.

$H_2S$ is removed from the feed by the Sulfa Treat process 101. This uses a proprietary reagent, supplied by MiSWACO (Ohio, USA), or NATCO through the Axsia Group (Gloucester, UK—01452 833800), which is held in two sequential low pressure rectangular vessels designed by Dynamic Engineering—3.3 metres high by 2.28×2.8 metres plan area. Each vessel has a bed depth of 1.6 metres and contains about 12 m³ (10.9 metric tons) of reagent, which has to be discarded about every twelve months.

Figure 8:
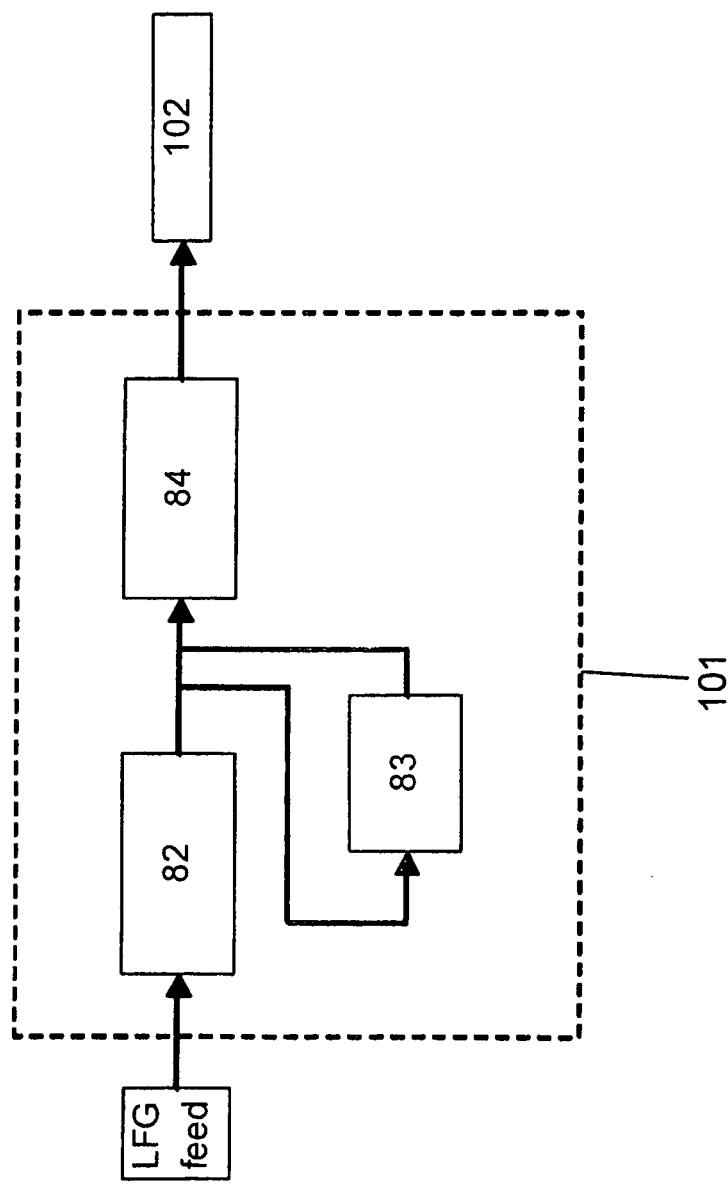
FIG. 8 is a flow diagram for Sulfa-treat $H_2S$ removal.

FIG. 8 shows the Sulfa Treat process 101 in greater detail. The feed gas passes through the lead vessel 82, after which it is sampled for analysis in unit 83, and then passed through the second, trail vessel 84 in order to provide a polishing action for $H_2S$ removal. When the concentration at the sampling point starts to increase, this signifies that the capacity of the lead vessel 82 is exhausted. The feed now passes only through the trail vessel 84, while the lead vessel 82 is recharged. This is accomplished by vacuum recovery of the spent reagent, followed by refilling with fresh material. This recharged vessel is then reconnected as a polishing stage, now configured as a trail vessel, essentially reversing the order of flow through the pair of vessels 82, 84. This interchange is effected each time the lead column 82 becomes exhausted. This operational procedure ensures the continuity of $H_2S$ removal to the required levels. After $H_2S$ has been removed the LFG fuel is passed to a compressor 102.

The $H_2S$ is removed by reacting with his material to produce ferric sulphide.

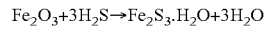

This may be disposed of on landfill sites, as natural air oxidation converts the sulphide to elemental sulphur, which is inert under normal conditions.

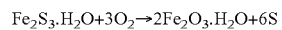

The overall reaction therefore would become:—

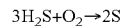

However, if direct disposal to Landfill were no longer possible after exhaustion of the reagent, the vessel could be taken off-line and air passed through it to regenerate the reagent as a third container. This would minimise mechanical discharge of Sulfa Treat annually, as it could be re-used a number of times until the elemental sulphur content has risen to approximately 50%. Instead of disposal to Landfill, this could be utilised, for example, in the manufacture of Sulphuric Acid.

There is also the option of recovering the sulphur in-situ by recirculating an inert heated gas through the saturated column so that the sulphur melts (at 114-119° C.) and then vaporises (at 444.6° C.) when it is transferred to a condenser and recovered as molten sulphur. However, due to the high temperatures used, it is doubtful whether this last stage would be economic. This product is currently marketed by Gastec Technology BV under the tradename of Selox.

Figure 1:
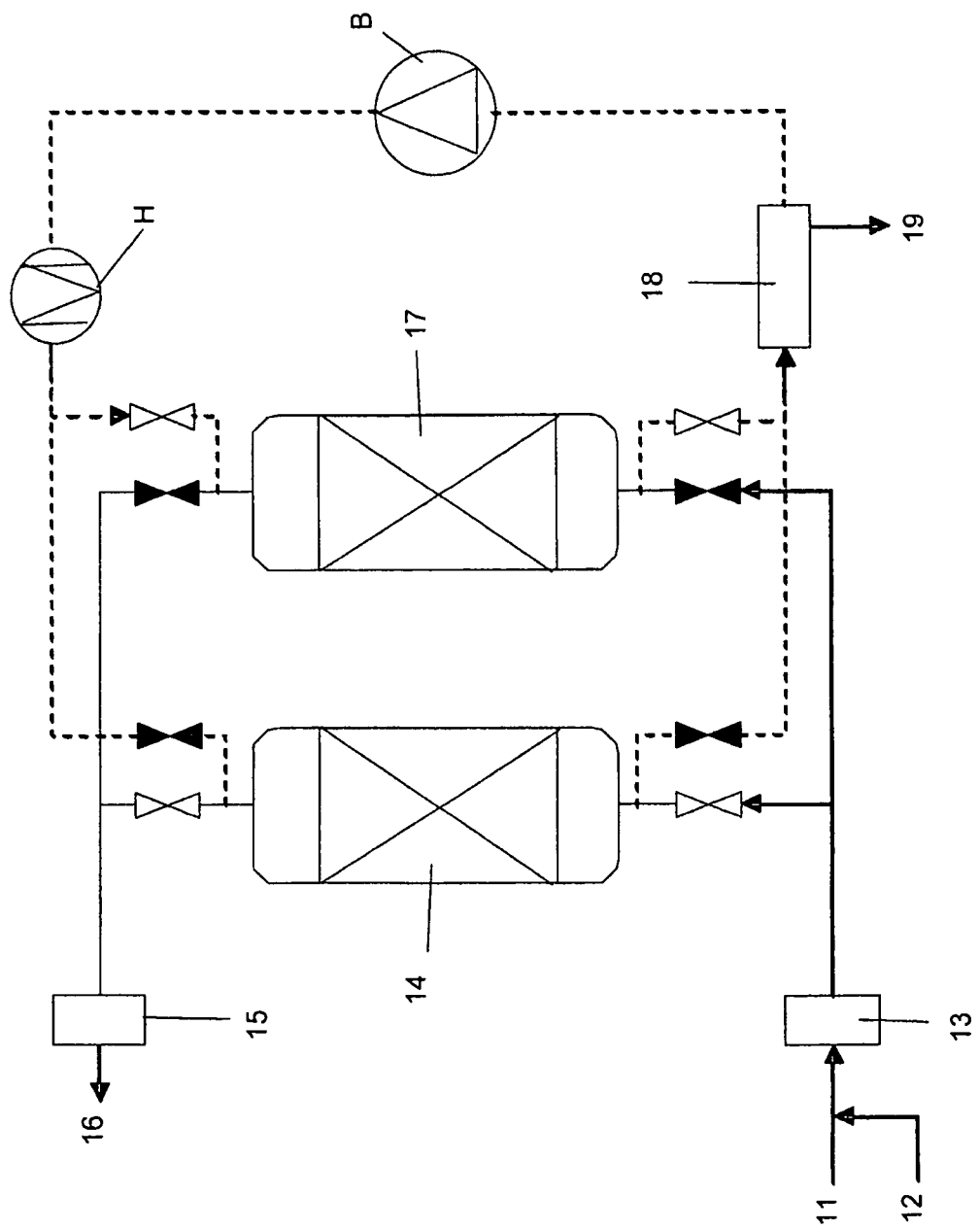
FIG. 1 is a flow diagram of the Selox process, a standard technique in the art.
Figure 2:
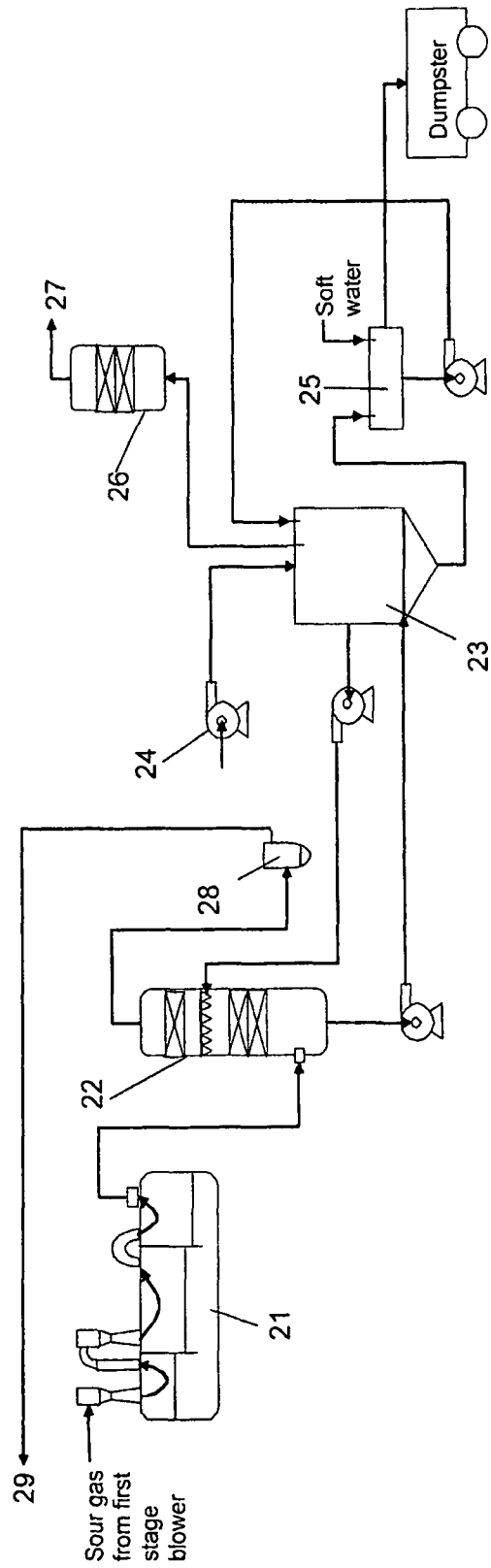
FIG. 2 is a flow diagram of the Lo-Cat® process as implemented in the Pompano plant.
Figure 3:
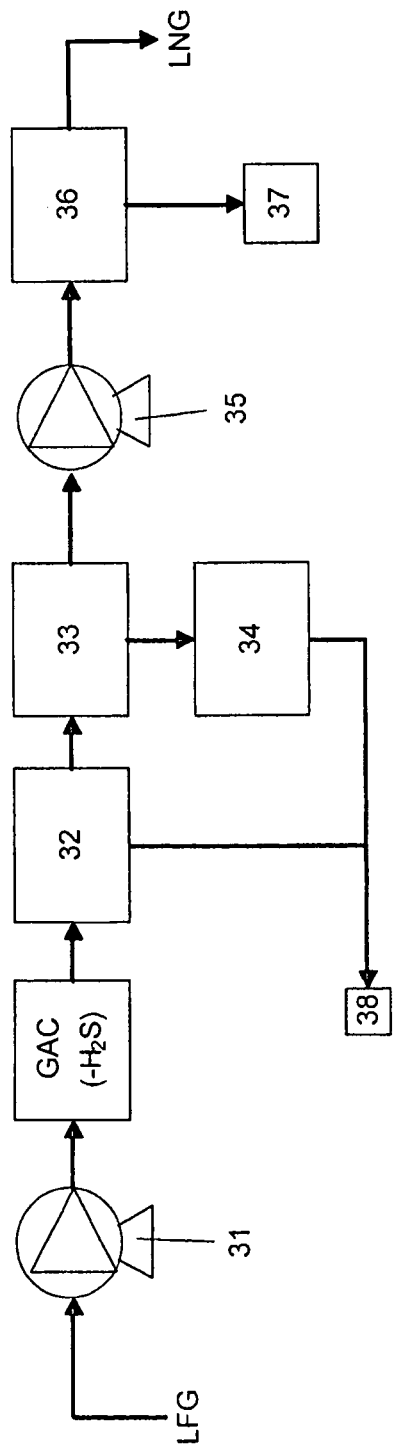
FIG. 3 is a flow diagram of a standard methane recovery and purification process.
Figure 4:
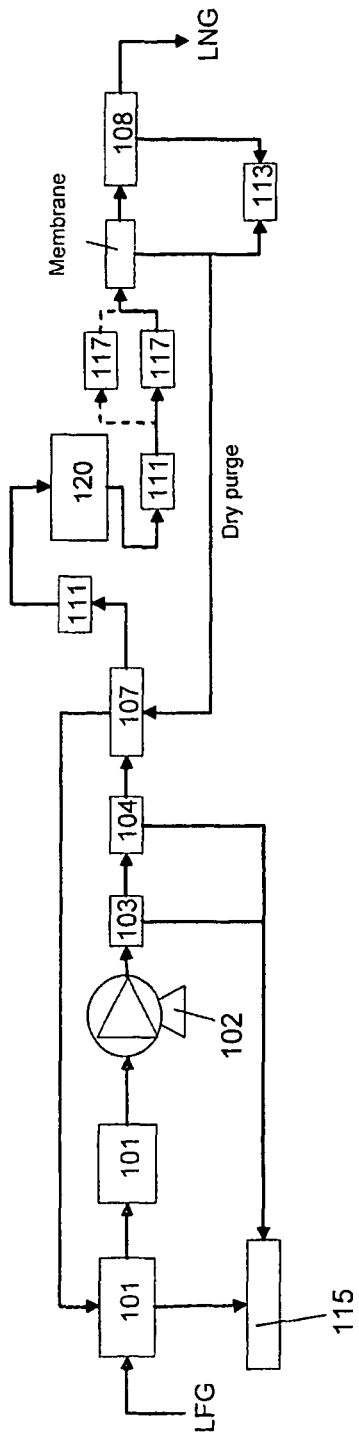
FIGS. 4, 5, 6 and 7 are flow diagrams that illustrate schematically the process steps of the present invention.

Referring now to FIG. 4 as the bleed from a Pressure Swing Drier 107 is recycled back through the Sulfa Treat unit 101 (in order to recover its methane content), the regenerated water carried in this stream is deposited in the lead Sulfa Treat vessel. As a result, a peristaltic pump has been installed to provide a continuous drain to the effluent separation vessel.

After $H_2S$ removal in Sulfa Treat Unit 101, the LFG is then compressed to a pressure of 9.5 Bar (0.95 MPa) in a flameproof plant at a nominal temperature of 20° C. before further processing. As the gas being compressed contains water and carbon dioxide which can cause acid corrosion, stainless steel should be used as a material of construction of compressor 102.

The gas is then cooled to a temperature of between 0.1° C. and 10° C., preferably about 3° C. by means of a chiller and heat exchanger 103. The temperature is chosen to avoid ice formation. A separation vessel with an auto-drain is attached to the heat exchanger 103, to remove condensate, which contains water, siloxanes and greater than 95% of the VOCs. This is routed to the effluent separation tank 115. All these units are constructed from stainless steel.

The gas is then passed through a coalescing filter 104 to remove particulate matter having particle size above 0.5 μm. These filters 104 are also fitted with auto-drains which are piped to the separation tank.

The filters 104 may be polymeric (PTFE), metal (stainless steel) or ceramic (alumina) membranes which may be regenerated by back-flushing. Alternatively, if they are depth filters fabricated from microfibre felts made from polyester, acrylic, nylon, Nomex® or polypropylene they must be replaced when the permeability of the filters 104 is reduced due to fouling.

The subsequent processing of the feed gas can be carried out by a number of different processes as set out by the latter stages of the processes shown in FIGS. 4 to 7. These remaining steps ensure the removal of oxygen, carbon dioxide, nitrogen and volatile organic compounds. All of these processes have a pressure swing adsorption process (PSA) 107. This PSA process 107 may follow directly after the particulate removal by the filters 104 or there may be other intervening steps.

The gas is then dried to a dew point of −60° C. (<7 ppm by mass) and more of the vapour phase organic compounds removed in a pressure swing adsorption process (PSA).

The PSA drier 107 consists of two separate adsorbent chambers (not shown). One chamber dries the gas while the other is being regenerated by a reduction in pressure which provides a continuous drying operation. The "wet" gas enters at the bottom of one chamber and passes upward through the adsorbent, preferably activated alumina which dries the gas. This dried gas then passes through the outlet at the top. At the same time, a bleed from the $CO_2$ membrane removal reject stream is expanded through an orifice between the chambers to regenerate the bed of the idle vessel. This purge flows down through the other chamber in order to regenerate the adsorbent. The purge flows then passes out through the purge exhaust valve to the feed of the sulphur reaction vessel to recycle the methane content of the purge stream. This stream carries with it the vaporised water from the drying stage, which condenses in the Sulfa Treat reagent, and then passes to the effluent system. At the end of the PSA cycle, the gas drying process is automatically reversed through the use of pneumatic valves.

The PSA for $CO_2/CH_4$ separation is normally based on Molecular Sieve or GAC. However, when this final stage is just for $CO_2$ polishing, a solid adsorber with surface basicity (e.g. alumina, MgO, alkaline Zeolite or ZnO) are potential alternative selective adsorbers. This function can be combined with that of final drying and VOC polishing, if required.

In the example of the invention shown in FIG. 4, at the same time, a bleed from the $CO_2$ membrane removal reject stream is expanded through an orifice between the chambers to regenerate the bed of the idle vessel. This purge flows down through the other chamber, regenerating the adsorbent, and passes out through the purge exhaust valve to the feed of the sulphur reaction vessel to recycle the methane content of the purge stream. This stream carries with it the vaporised water from the drying stage, which condenses in the Sulfa Treat reagent, and then passes to the effluent system. At the end of the PSA cycle, the gas drying process is automatically reversed through the use of pneumatic valves.

The benefits of this process are that it is simple, given a good separation and operates at lower pressures than competing processes.

Additional water vapour removal is achieved in the subsequent membrane and Molecular Gate Pressure Swing systems 108, primarily targeting $CO_2$ and $N_2$ removal respectively.

As shown in FIG. 4, the product stream from the PSA drier 107 is then passed through a Granular Activated Carbon (GAC) absorber unit 111 for final VOC polishing. Due to the low VOC challenge anticipated at this stage of the overall process a one-shot absorber is used. This stage should be followed by a post GAC guard filter 117 to prevent carbon dust being transferred to the downstream carbon dioxide separation membranes. If the filter needs replacing, there is a second stand-by unit already plumbed in position and ready for activation by switching a valve.

The GAC column III is used in the normal series lead/trail configuration with analysis between them to indicate breakthrough on the lead column, signalling the need for column exchange. A cold finger method 120 of trapping residual volatiles has been specified for this sampling duty, as by chilling under pressure to −40° C. gives an enhanced capture of residual VOCs. Use of this cryogenic process has also been considered as a bulk gas treatment process.

Figure 5:
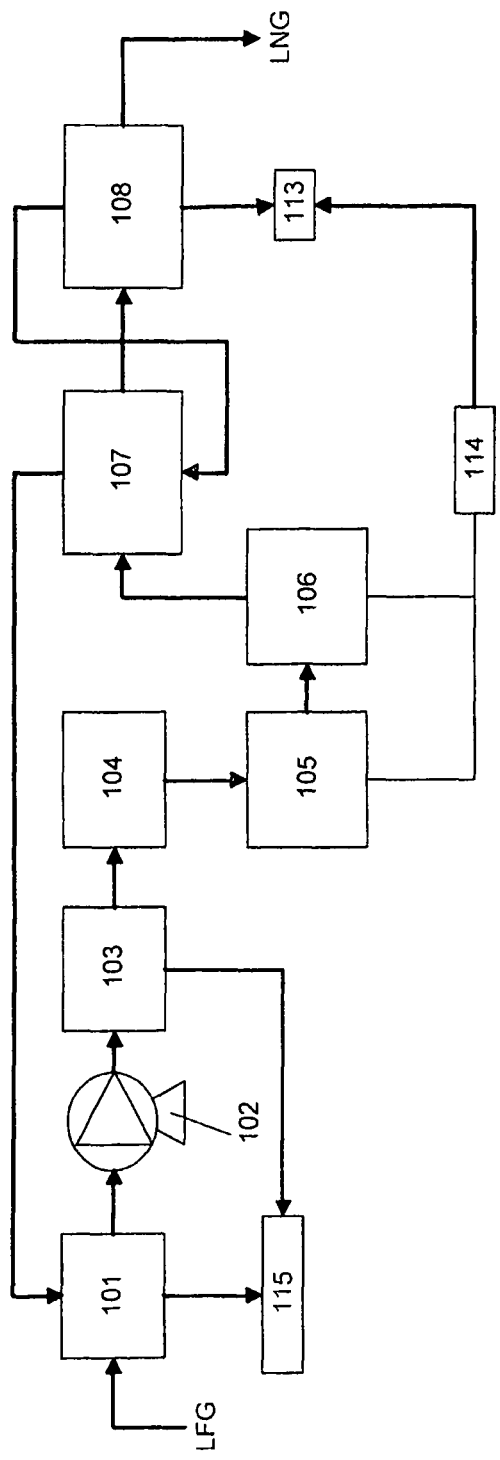

FIG. 5 shows a process 300 that begins with the same opening steps as that of FIG. 4, namely Sulfa Treat 101 to remove the $H_2S$ followed by a compression step 102, chiller 103 and filter 104. The feed gas is then passed through membrane units to remove first carbon dioxide 105 and then oxygen 106 before the PSA process 107 for removing residual water vapour and VOCs. There is then an additional PSA step 108 for removing Nitrogen. This can be accomplished using an engineered molecular pore absorber (Molecular Gate). The unwanted gases are then disposed of in a flare 113.

Nitrogen is removed in an Engelhard Molecular Gate® PSA plant, based on an engineered titanium silicate molecular sieve absorber which is selective for $CO_2$, $O_2$, $H_2O$ and $N_2$ over $CH_4$ on the basis of molecular size inhibiting adsorption of the latter in the surface pores. These materials have unique surface properties as well as the unique ability to adjust pore size openings. The pore size is precisely adjusted within an accuracy of 0.1 angstrom in the manufacturing process. This allows the production of a molecular sieve with a pore size tailored to size-selective separations.

Nitrogen and methane molecular diameters are approximately 3.6 Å and 3.8 Å, respectively. In an Engelhard Molecular Gate® adsorption-based system for upgrading nitrogen contaminated natural gas, a pore size of 3.7 Å is used. This adsorbent permits the nitrogen to enter the pore and be adsorbed while excluding the methane, which passes through the fixed bed of adsorbent at essentially the same pressure as the feed.

The Molecular Gate nitrogen rejection process takes a unique approach as compared with other commercial nitrogen rejection technologies, by adsorbing nitrogen from the feed stream while producing the product sales gas at essentially feed pressure. This feature preserves the available feed pressure.

The same principle applies for $CO_2$ removal (molecular diameter of 3.3 Å) from natural gas with Molecular Gate adsorbents.

However, it should be noted that $CH_4$ can adsorb on the outer surface of the granules where size exclusion does not operate. This finite capacity of $CH_4$ adsorbed, limits the separation possible from $N_2$, thus resulting in a loss of about 15% $CH_4$ in order to meet the $N_2$ specification in the recovered methane of less than 5%.

Figure 6:
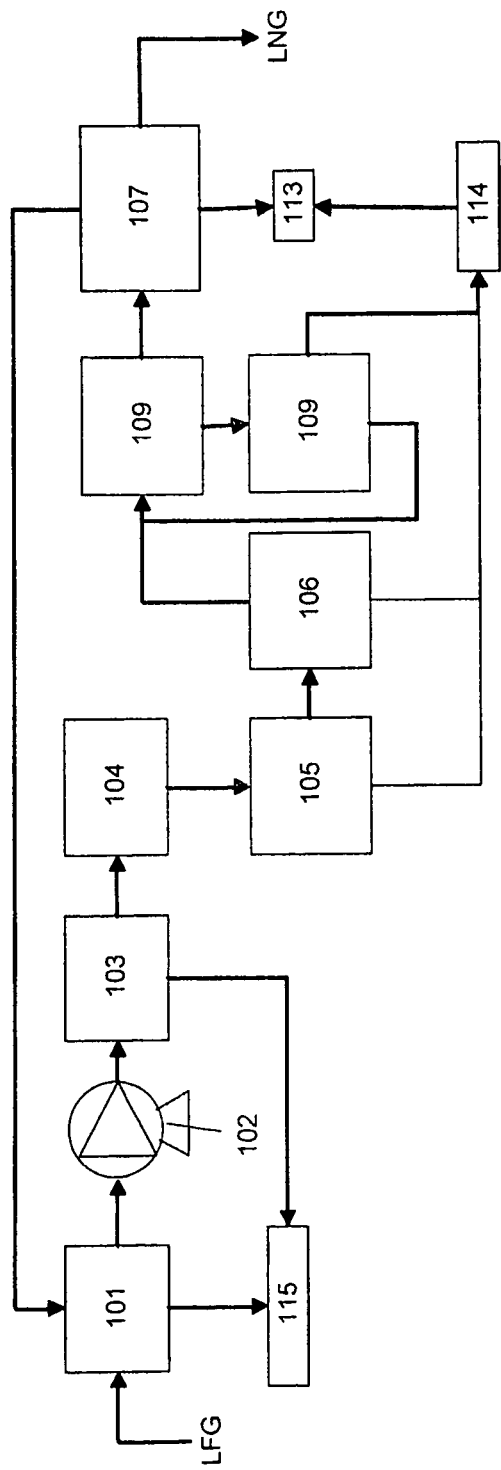

FIG. 6 shows a further variant on the process of FIG. 5. It differs in that the nitrogen is removed by a double membrane cascade 109 rather than the second PSA step 108 shown in FIG. 5.

Figure 7:
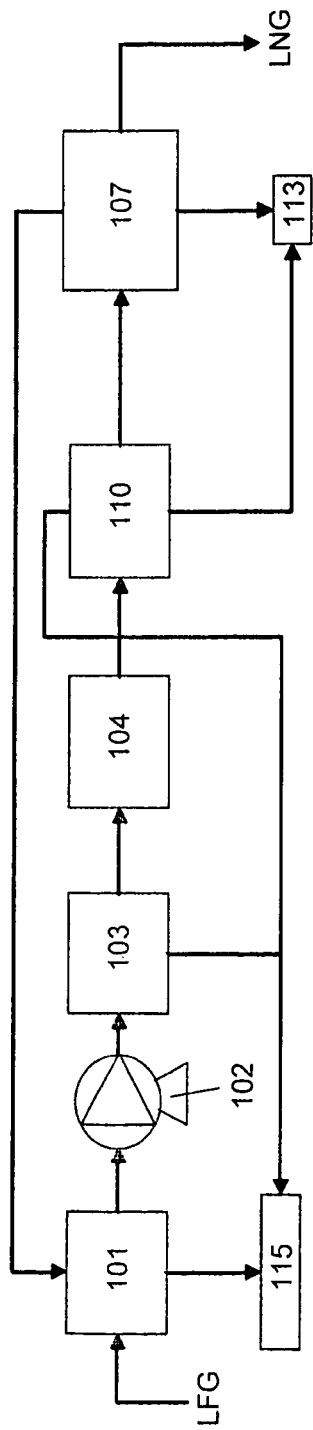

FIG. 7 shows a variant of the above processes that begins with the same Sulfa treat step 101 to remove the $H_2S$ followed by a compression step 102, chiller 103 and filter 104 as shown in FIG. 4. The feed gas is then subjected to a centrifugal separation 110.

The centrifugal separator 110 used in this process is based on a separator developed by The Uranium Enrichment Corporation of South Africa, Ltd. (UCOR). UCOR developed and deployed its own aerodynamic process characterized as an Advanced vortex tube or Stationary-walled centrifuge at the so called plant at Valindaba to produce hundreds of kilograms of HEU. In this process, a mixture of $UF_6$ and $H_2$ is compressed and enters a vortex tube tangentially at one end through nozzles or holes at velocities close to the speed of sound. This tangential injection of gas results in a spiral or vortex motion within the tube, and two gas streams are withdrawn at opposite ends of the vortex tube. The spiral swirling flow decays downstream of the feed inlet due to friction at the tube wall. Consequently, the inside diameter of the tube is typically tapered to reduce the decay in the swirling flow velocity.

Due to the small cut of the vortex tube stages and the extremely difficult piping requirements that would be necessary based on traditional methods of piping stages together, the South Africans developed a cascade design technique, called Helikon. In essence, the Helikon technique permits 20 separation stages to be combined into one large module, and all 20 stages share a common pair of axial-flow compressors. A basic requirement for the success of this method is that the axial-flow compressors successfully transmit parallel streams of different compositions without significant mixing. A typical Helikon module consists of a large cylindrical steel vessel that houses a separating element assembly, two axial-flow compressors (one mounted on each end), and two water-cooled heat exchangers.

FIGS. 9 to 12 show various features of the chiller 103. The chiller 103 comprises a shell 67 containing a plurality of tubes 61, each tube 61 having a bore 63 through its centre. The spaces 64 between the tubes 61 are provided in order to facilitate the flow of a refrigerant fluid. The shell 67, tubes 61, bores 63 and intervening spaces 64 together comprise a heat exchanger 68. The heat exchanger 68 is further provided with tangential inlets 69 to the individual bores 63 to induce a helical vortex flow 62 as it passes into each bore 63. This is either in the form of individual caps 65 on each of the plurality of bores 63 or, more conveniently, as a single plate 66 provided on the plurality of bores 63. The advantage of the single plate 66 is that it is considerably simpler to manufacture and fit than the plurality of caps 65.

In addition, the chiller 103 is provided with a sensor (not shown) that detects any difference in pressure between the flow or feed gas and the flow of refrigerant. The intention is to maintain the two flows at the same pressure so that the walls of the bores 63 can be made from very thin material that will therefore maximise the efficiency of the heat transfer across the heat exchanger 68. The sensor is preferably a membrane sensor. The internal surfaces of the plurality of bores 63 are provided with a smooth surface finish in order to encourage the condensate to drain away easily. Such a finish may be provided by, for example, a metal deposit such as bright electroless nickel or by polishing, for example by electropolishing.

Alternatively a shell and tube design with a rifled bore can be used and this enhances heat transfer, with the feed passing downwards. The shell-side is cooled to between 0.1° C. and 10° C., typically 3° C., in order to prevent freezing and consequent blockage, with a counter-current flow from the coldside of a heat-pump. Under the elevated pressure, water and VOCs will condense from the chilled gas. The maximum temperature is determined to eliminate as much humidity as is practically possible from the gas stream. The condensate will run to the bottom of the heat-exchanger, where it is discharged by an auto-drain, while the gas is removed from a side take-off for further processing. The swirling motion down the tube will encourage coalescence of the larger particulates in the condensate. This effectively removes particles down to about 0.1-1 µm.

Figure 9:
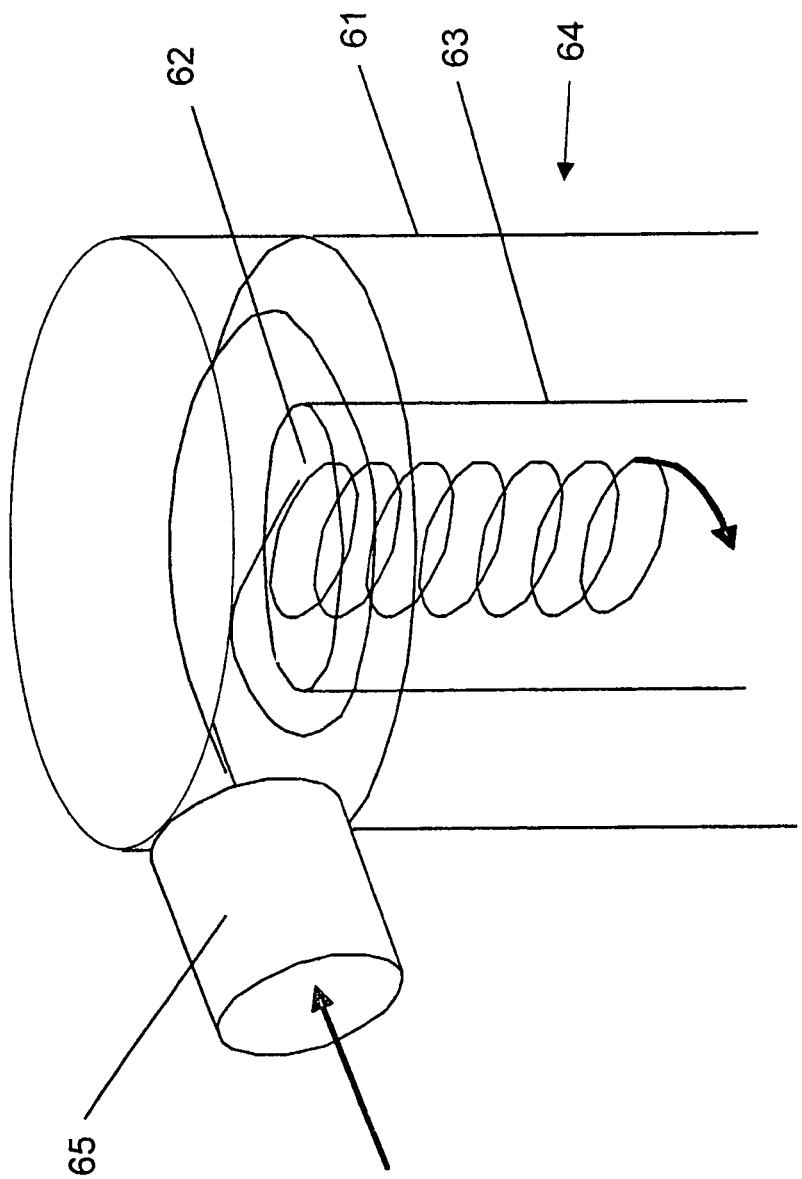
FIG. 9 shows schematically a tangential flow adapter for the upper inlet of an individual heat exchanger tube.
Figure 10:
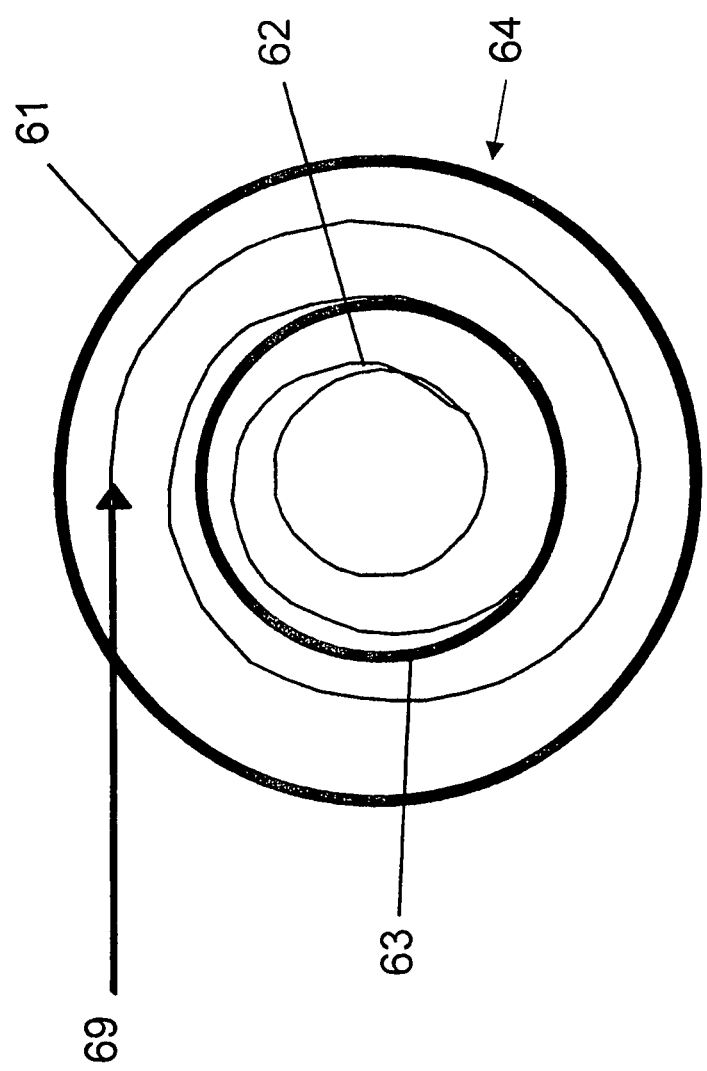
FIG. 10 shows a plan view of the heat exchanger tube of FIG. 9 with the path of the gas illustrated.
Figure 11:
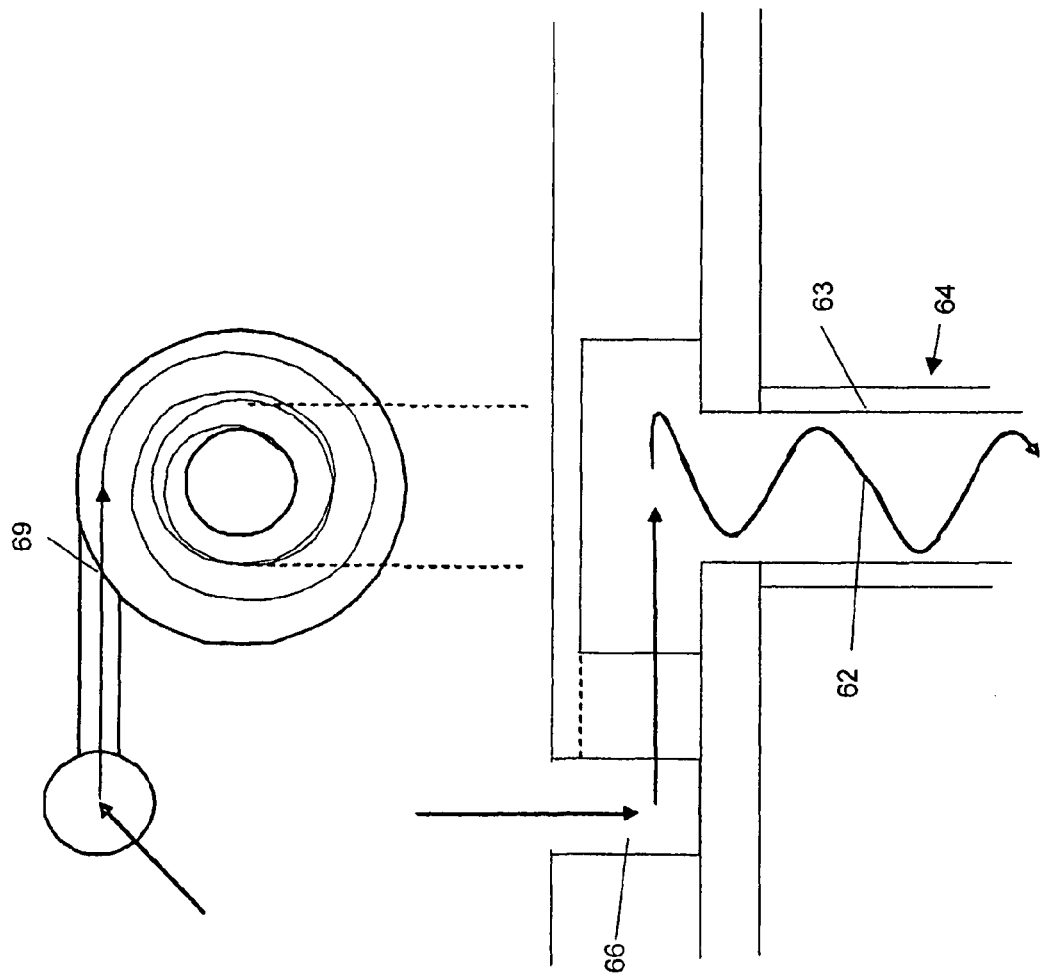
FIG. 11 shows a vortex inducing tangential flow device incorporated in the upper plate of the chiller.
Figure 12:
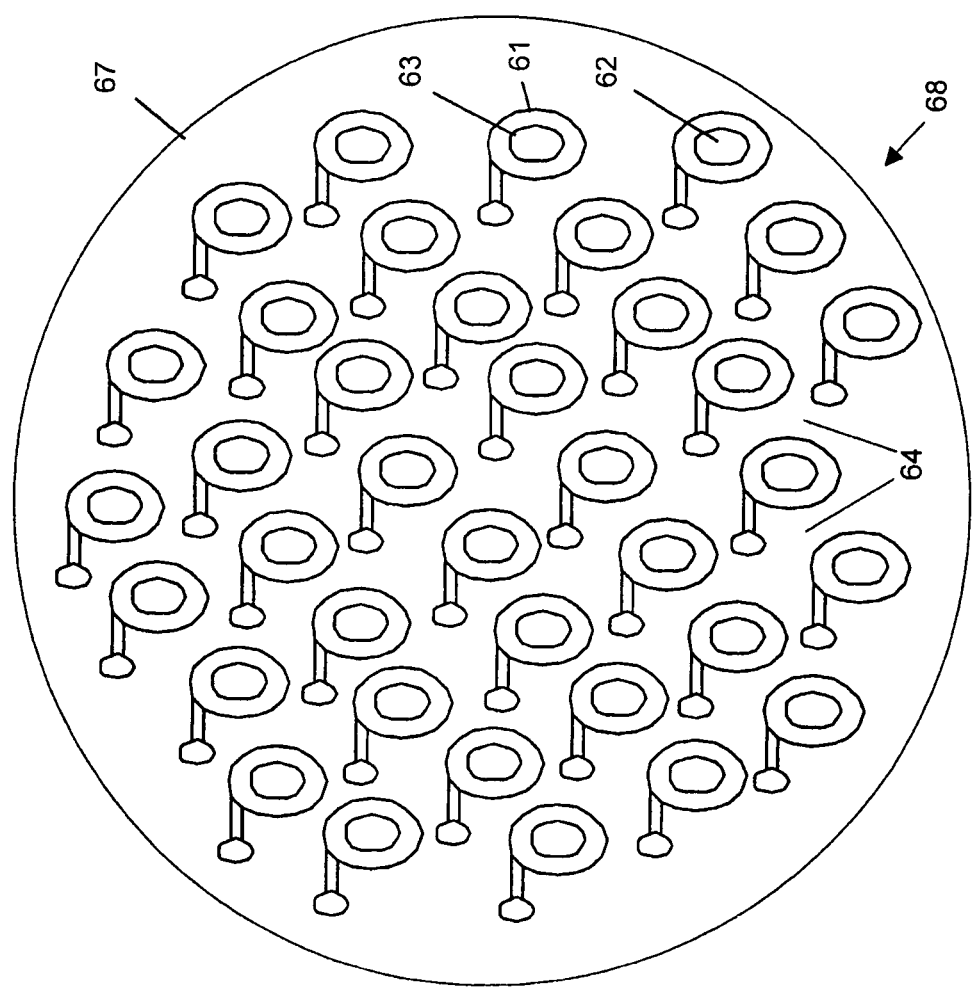
FIG. 12 shows a plan view of a plurality of vortex inducers in the chiller upper plate as shown in FIG. 11.

In addition, or as an alternative to the rifled bore configuration, a tangential inlet device can be incorporated as either a cap 65 as shown in FIG. 9 or incorporated into the upper distributor plate 66 of the heat exchanger plate as shown in FIGS. 11 and 12. The cap 66 or distributor plate vortex inducer 66 can be used in combination with a conventional smooth-bored tube for both of these configurations are intended to produce the spiral flow shown in FIGS. 10 and 11, as the gas descends down the chiller tube, a spiral flow is created.

The removal of oxygen may be carried out using a membrane 106 in accordance with the processes shown in FIGS. 4 to 6, alternatively, centrifugal separation 110 can be used, as in FIG. 7. In accordance with FIGS. 4 to 6, carbon dioxide is removed using a membrane 105, and oxygen is removed using a membrane 106. The absorbers that comprise the membranes 106 are typically cobalt-N complexes which give an excellent selective $O_2$ rejection under a partial pressure gradient. The absorbers that comprise the membrane 105 are typically materials such as Polyethylene glycol diacrylate or diethanolamine crosslinked polyvinylamine, PVP, glycerol, glycine, amine modified polyimide, poly dimethylaminoethylmethacrylate, diisopropylamine, polyethylene oxide gave separation factors over $N_2$ of between 100 and up to 5,000.

Figure 13:
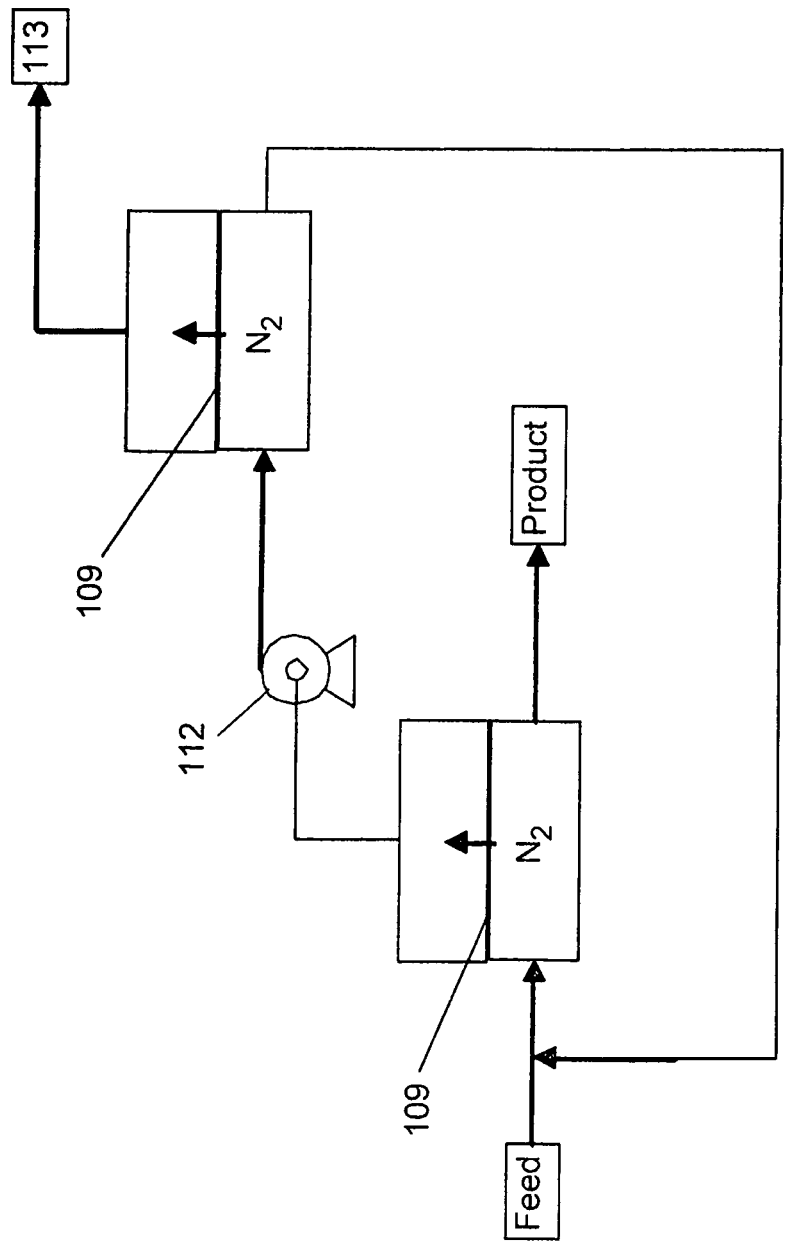
FIG. 13 shows a double membrane cascade for the removal of nitrogen from the feed gas.

FIG. 13 shows, schematically, a double membrane cascade for the removal of nitrogen from the feed gas. The use of $N_2$ permselective membranes 109 (Fluorocyclic compounds, hexa-fluoropropane di-imide, PEEK, FAU Zeolite, aluminophosphate/polyimide), which are generally less selective than $CO_2$ and $O_2$, has not been described in the prior art for LFG treatment without prior use of $CH_4$ permselective membrane stages. Due to the relatively low selectivities of current membranes, this part of the process would need multiple stages (at least two) with recycling through repressurising pump 112 to achieve the $N_2$ target in the product without having unacceptable $CH_4$ losses. A cascade, as shown in FIG. 13 with a $N_2/CH_4$ Selectivity of 5 and a pressure ratio of 10, could give a 4% $CH_4$ loss to the flare, with only 2.4% $N_2$ in the product from a 15% feed.

Most membranes are permeable to water vapour, for example with Cellulose acetate provides 1000 selectivity over $CO_2$, although factors of 100 are more commonly found. This is driven by the elevated pressure of the feed into a low humidity purge stream at low pressure.

A composite membrane structure might be fabricated from the key absorptive element for $O_2$ as previously described in the literature reviewed above, but combined in a single membrane with a $N_2$ selective membrane materials (eg PEEK, fluorocyclic structures, or composite engineered inorganic phases with molecular porosity—FAU Zeolite or aluminophosphate/polyimide), to leave $CH_4$ in the product stream. This would produce a single membrane that could permeate $O_2$ and $N_2$, while retaining the desired $CH_4$, by purging into a dry $CO_2$ stream derived from a separate $CO_2$ membrane unit. Alternatively all three permeation media could be combined in a single membrane material, and be purged into a partial vacuum.

Figure 14:
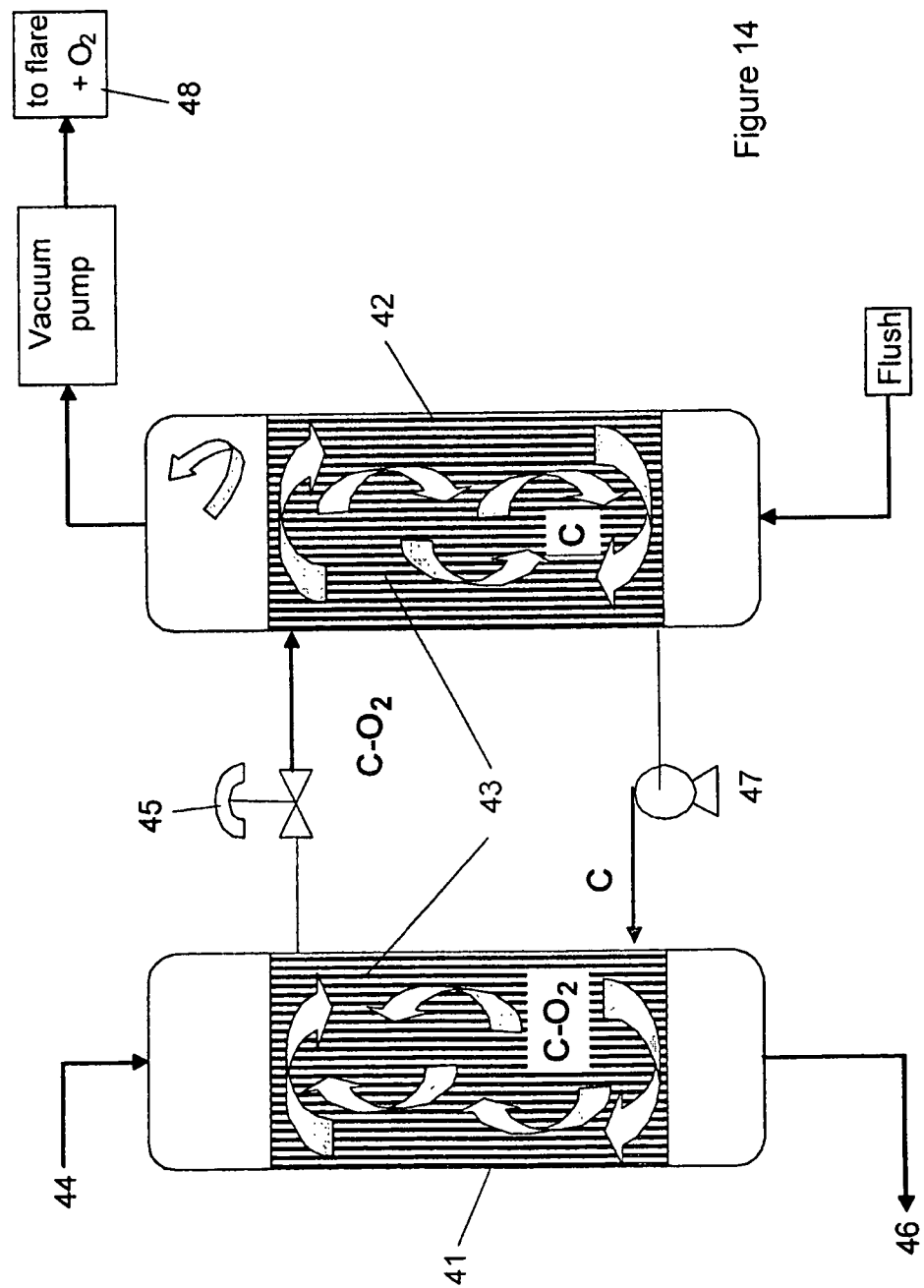
FIG. 14 shows dual hollow-fibre reversible selective oxygen absorber transfer.
Figure 15:
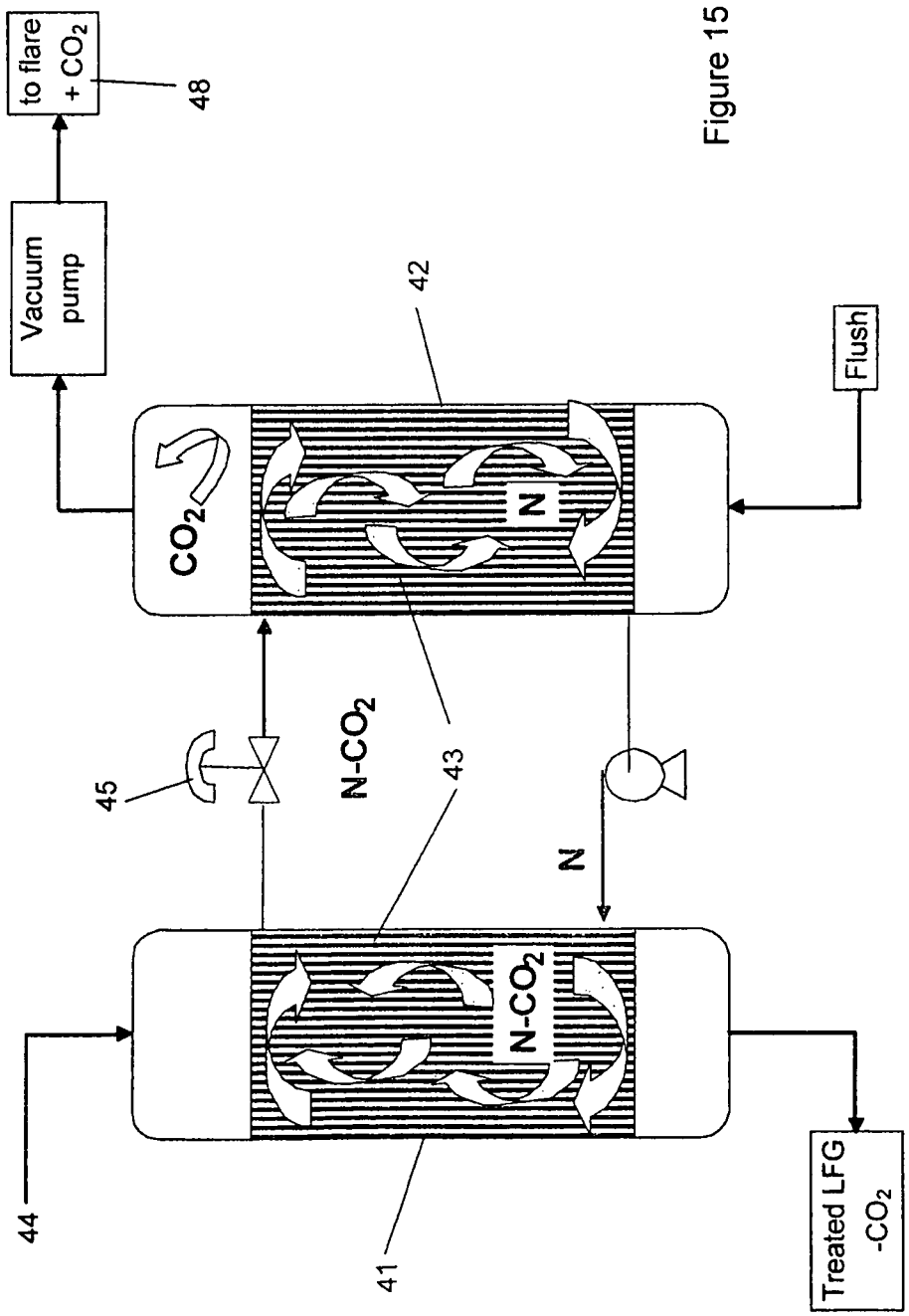
FIG. 15 shows dual hollow-fibre reversible selective carbon dioxide absorber transfer.

FIGS. 14 and 15 show dual hollow-fibre reversible absorber selective gas transfer units. The example in FIG. 14 is used to remove oxygen from the feed gas and the example shown in FIG. 15 is used to remove carbon dioxide.

The use of hollow fibre contactors as a means of stabilising water/gas interfaces—even under pressure (due to surface tension at the hydrophobic fibre surface), can be configured to allow transfer of $O_2$ or $CO_2$ from the feed to a purge stream under a pressure gradient, by means of a reversible absorber in the liquid phase. For oxygen removal, this could be a cobalt complex with porphyrins or amino acids, while for $CO_2$, a weak base (e.g. water soluble amine with a low vapour pressure) could be used.

In each of these systems there are two parts 41, 42. The feed gas is introduced into the first part 41 that comprises a plurality hollow fibre contactors 43. Each of the fibres 43 has a capillary at its centre through which the feed gas stream 44 can flow when it is introduced into the first part 41.

In the example shown in FIG. 14, for oxygen removal, there is a reverse flow of a cobalt complex, labelled C on FIG. 14, between the contactors 43. This sets up a partial pressure gradient that encourages the oxygen to pass through the pores in the fibre. The oxygen then complexes with the cobalt complex and is thus removed from the feed gas stream. The feed gas, now lacking in oxygen 46, leaves the first part 41 of the absorber to continue to the next part of the purification process in accordance with the flow diagrams shown in FIGS. 4 to 7.

The cobalt-oxygen adduct formed in the first part 41, is then removed to the second part 42. This part 42 works to replenish the cobalt complex for use in the first part 41. The second part 42 comprises a second set of hollow fibre contactors 43 and the reverse flow flush is an oxygen-poor gas stream, possibly induced by a vacuum pump encourages the oxygen to break the adduct with the cobalt complex. The cobalt complex is then free to be returned 47 to the first part 41 and then oxygen is discharged to the flare 48.

Removal of $CO_2$ by absorption into a mildly basic amine (with a low vapour pressure) solution as a reversible complex that can be desorbed under low pressure or elevated temperature is a well established technology. This approach is also effective at removing other acid gases such as $H_2S$. This is illustrated in FIG. 15 where like reference numerals have been used to describe those parts of the system that are common with FIG. 14. "N" refers to a weak base which is used in place of the Cobalt complex of FIG. 14 to form an adduct with the carbon dioxide.

The invention claimed is:

1. A process for recovering methane from landfill feed gas and other anaerobic digesters, the process comprising the following steps:
    firstly treating the feed gas to remove $H_2S$;
    subsequently, but before removing VOCs and water, compressing the gas;
    chilling the compressed gas to between 0.1° C. and 10° C. to remove water and VOCs,
    then further treating the gas to remove further impurities, including the steps of filtering it to remove particulate matter,
    passing the so filtered gas through a PSA dryer, a GAC absorber unit for final VOC processing, a post GAC guard filter to prevent carbon dust being transferred downstream, a membrane for removing carbon dioxide and a further PSA for removing nitrogen to produce natural gas: and then
    liquefying the natural gas into liquid natural gas.

2. The process according to claim 1, wherein the removal of impurities includes the further processing steps of:
    passing the feed gas through a first membrane to remove carbon dioxide,
    passing the feed gas through a second membrane to remove oxygen, and
    PSA for removing water vapour and VOCs and nitrogen.

3. The process according to claim 1, wherein the removal of impurities includes the further processing steps of:
    passing the feed gas through a first membrane to remove carbon dioxide, and
    PSA for removing water vapour and VOCs and nitrogen.

4. The process according to claim 1, wherein the removal of impurities includes the steps of:
    passing the feed gas through a first membrane for removing carbon dioxide, passing the feed gas through a second membrane for removing oxygen,
    passing the feed gas through a double cascade membrane for removing nitrogen and
    PSA for removing water vapour VOCs and residual carbon dioxide.

5. The process according to claim 1, wherein the removal of impurities includes the steps of:
    centrifugal separation for removing oxygen, nitrogen, carbon dioxide and VOCs followed by
    PSA for removing water vapour VOCs and residual carbon dioxide.

6. The process according to claim 1, wherein the removal of impurities includes the steps of:
    employing a PSA dryer for removing water vapour and VOCs, activated carbon columns for removing residual VOCs,
    employing at least one membrane for removing bulk carbon dioxide,
    employing an Engelhard Molecular Gate® multi-stage PSA for nitrogen removal with water and carbon dioxide residual polishing.

7. A process according to claim 1, wherein $H_2S$ removal is conducted by at least one of the following:
    reaction with a hydrated iron oxide in solid form reaction with an oxidising redox couple in solid form;
    scrubbing with a solution of a ferric complex with subsequent regeneration in a separate column with air; and
    polishing the stream in a downstream membrane, selective absorber process or PSA drier.

8. A process according to claim 1, wherein the feed gas is compressed to between 3 Bar (0.3 MPa) and 15 Bar (1.5 MPa).

9. A process according to claim 1, wherein removing $H_2O$ is carried out by at least one of the following:
chilling the gas to between 0.1° C. and 10° C. to condense the water;
selective water vapour permeation across a membrane; and using a PSA unit.

10. A process according to claim 9, wherein the chiller is a rifled tube and shell heat exchanger.

11. A process according to claim 10, wherein the chiller has a tangential feed into a smooth bored tube to induce a helical flow to aid the coalescence of larger particles.

12. A process according to claim 9, wherein the chiller further comprises a vortex-inducing tangential flow device, incorporated into each of the plurality of heat exchange bores.

13. A process according to claim 1, comprising the step of:
removing VOCs by using at least one of the following:
chilling the gas to between 0.1° C. and 10° C. under pressure of between 3 Bar (0.3 MPa) and 15 Bar (1.5 MPa) to condense the water and entrain some VOCs;
employing a PSA drier;
employing a GAC non-regenerated absorber; and a centrifugal separator.

14. A process according to claim 1, wherein removing particulate material is done by at least one of: the depth filter effect of a porous solid $H_2S$ removal system; a scrubber; and a low humidity stream at a filter.

15. A process according to claim 1, wherein removing $CO_2$ is done by using at least one of: a selective permeable membrane; a reversible absorber unit; a PSA with selective adsorption; and a centrifugal separator.

16. A process according to claim 1, wherein removing $N_2$ is carried out by at least one of the following: an $N_2$ selectively permeable membrane; a PSA with selective adsorption; and a centrifugal separator.

17. A process according to claim 1, wherein removing $O_2$ is carried out by at least one of the following: a reversible absorber unit; a we reduction and subsequent stream drying; a PSA with selective adsorption; a centrifugal separator; and dry reduction.

18. A process according to claim 15, wherein the reversible absorber unit operates by recirculation between two hollow-fibre gas/liquid contactors under a partial pressure gradient between the feed gas stream and an exhaust.

19. A process according to claim 18, wherein the exhaust is a partial vacuum.

20. A process according to claim 1, Previously Presented wherein each of the processes leaves the feed gas at between 3 Bar (0.3 MPa) and 15 Bar (1.5 MPa).

* * * * *